April 10, 1934.                    W. H. M. HIGHAM                    1,953,959
                                     LUBRICATION
                                 Filed Oct. 23, 1930              3 Sheets-Sheet 1
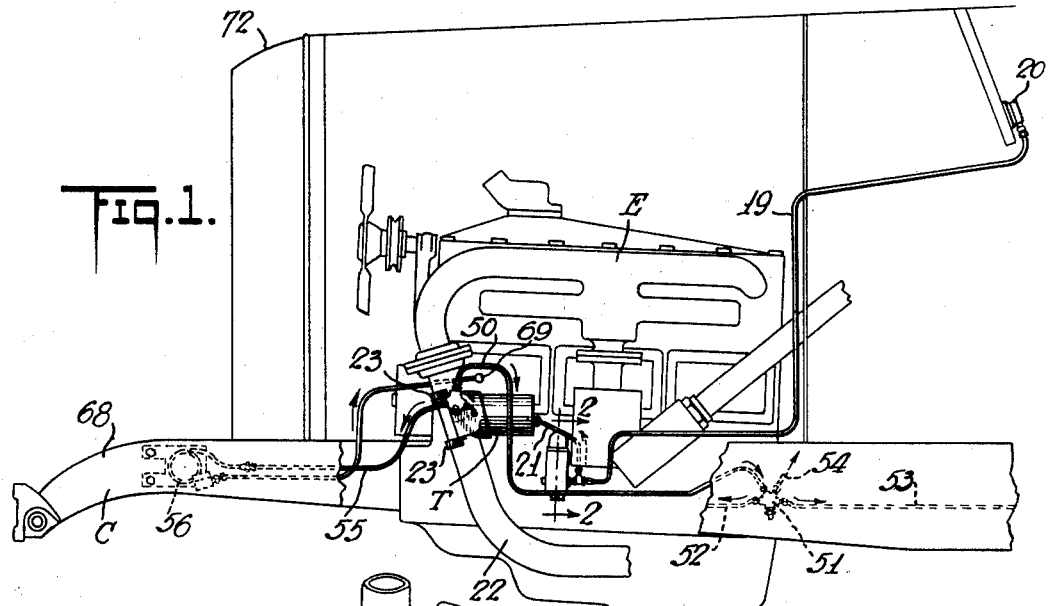
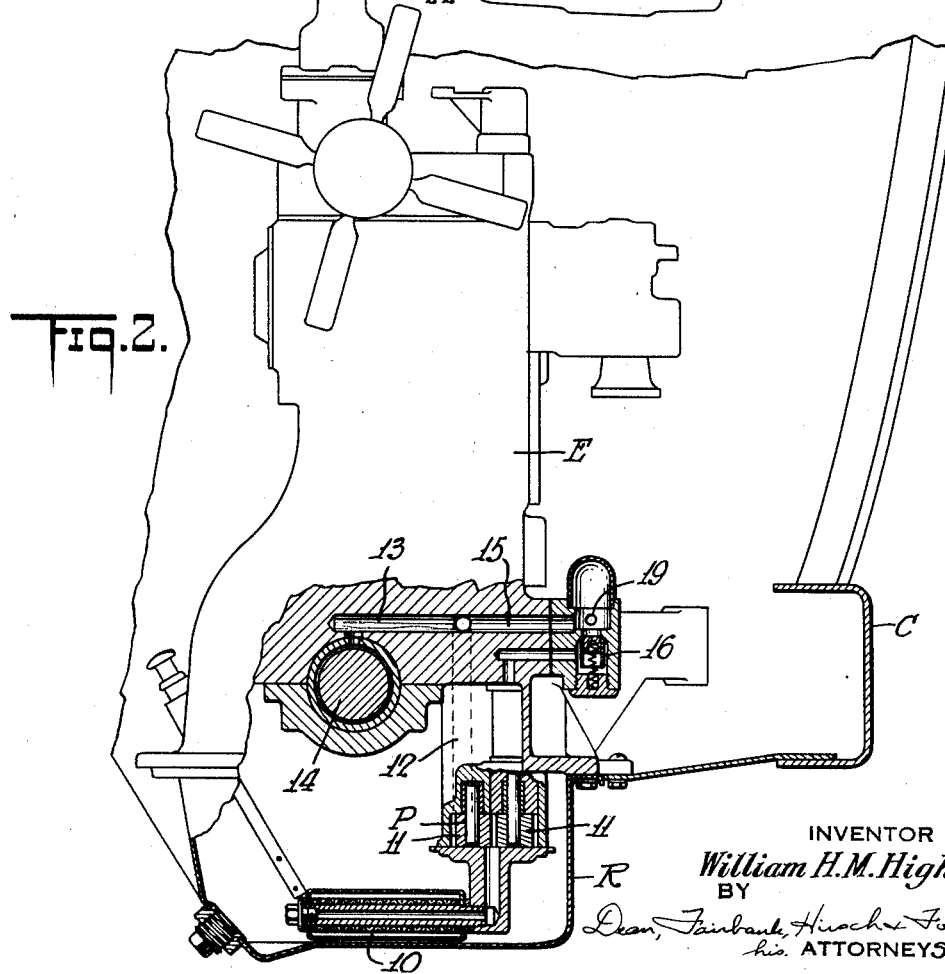
INVENTOR
William H. M. Higham
BY
Dean, Fairbanks, Hirsch & Foster
his ATTORNEYS April 10, 1934.  W. H. M. HIGHAM  1,953,959
LUBRICATION
Filed Oct. 23, 1930  3 Sheets-Sheet 2
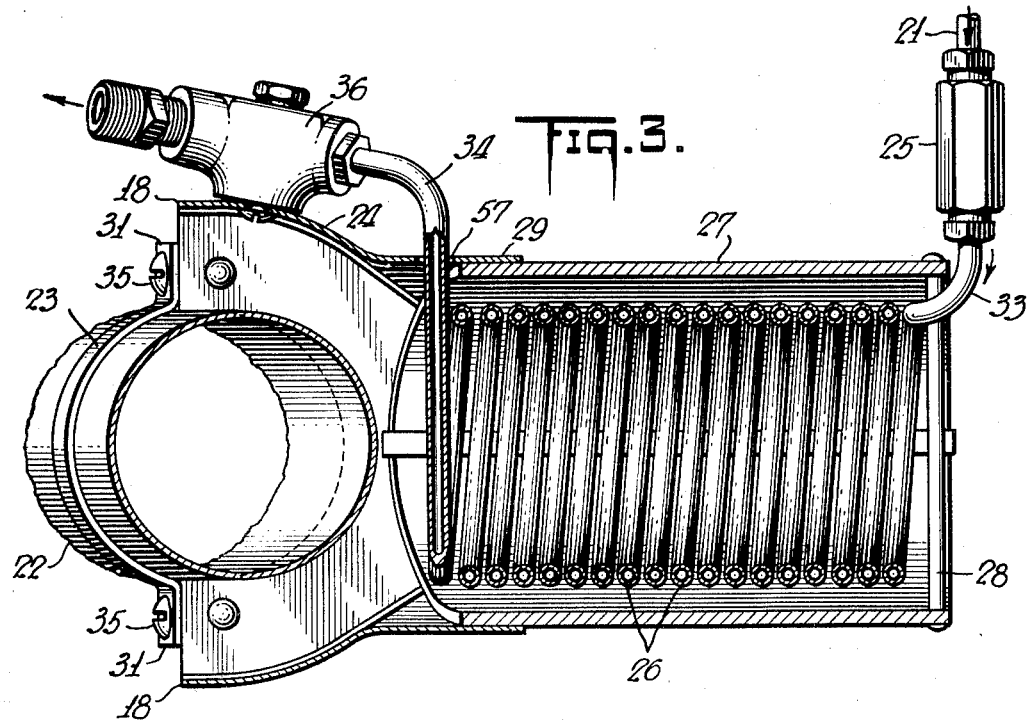
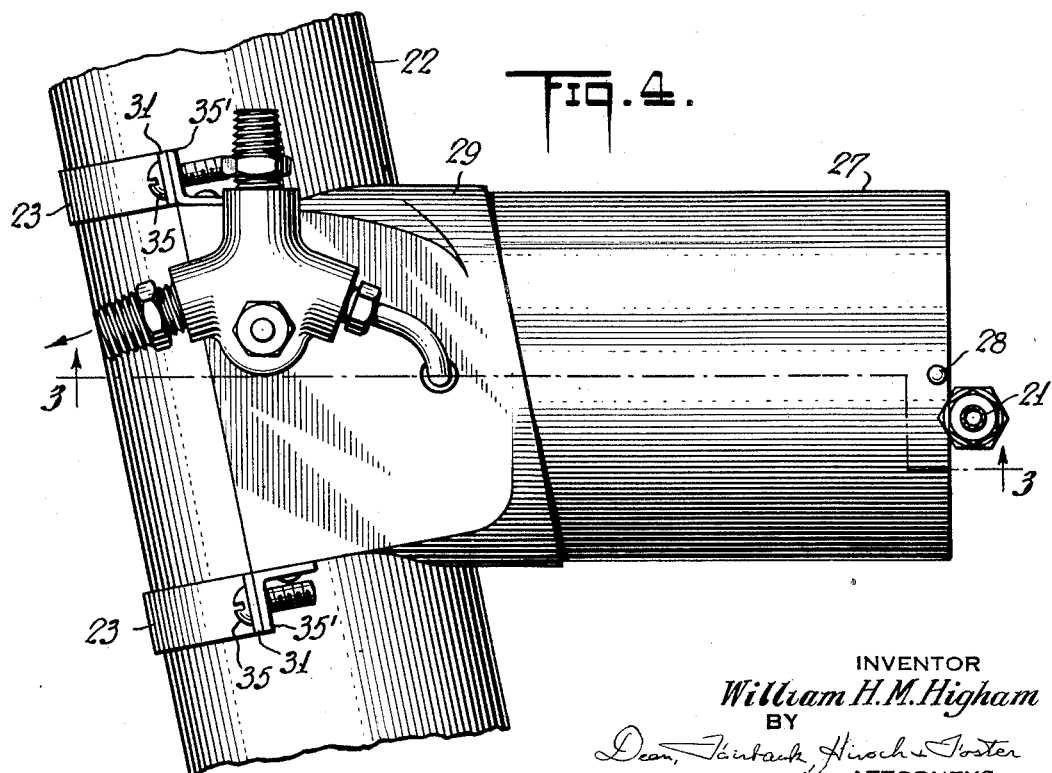
INVENTOR
William H. M. Higham
BY
his ATTORNEYS April 10, 1934.  W. H. M. HIGHAM  1,953,959
LUBRICATION
Filed Oct. 23, 1930    3 Sheets-Sheet 3

INVENTOR
William H. M. Higham
BY
Dean Fairbank, Hirsch & Foster
his ATTORNEYS

Patented Apr. 10, 1934

1,953,959

UNITED STATES PATENT OFFICE 1,953,959

LUBRICATION

William H. M. Higham, New York, N. Y., assignor to Auto Research Corporation, a corporation of Delaware Application October 23, 1930, Serial No. 490,574

14 Claims. (Cl. 184—7)

My present invention relates to liquid distribution and is primarily concerned with the lubrication from a central source of various bearings of a mechanism, and in its preferred application relates to the lubrication of the chassis bearings of motor vehicles.

The invention is more especially concerned with centralized automatic liquid feed systems of the type shown in the prior application of Joseph Bijur, Serial No. 412,982, filed December 10, 1929, and in preferred form is embodied in an installation devoid of operating or moving parts for conveying and distributing lubricant to the chassis bearings of an automobile, the oil in the engine oil pan constituting the source of lubricant and the engine oil pump the propulsive agency for feeding the chassis lines.

By the present invention I particularly seek to accomplish with sufficient proficiency for many practical uses, the general objects of said prior application, among which are to feed lubricant to the several chassis bearings throughout the operation of the vehicle in warm weather and in cold, in each case roughly in accordance with lubricant requirements, and to inhibit feed or leak to the bearings while the vehicle is out of use, all without resort to manual actuation or control, or even adjusting operations for adaptation to different conditions of use and without need to examine or effort to replenish a special oil reservoir.

A more particular object is to provide a system of the above type of simplified construction, especially inobtrusive and unlikely to become deranged in use, yet which may be devoid of cleansing means such as filters, strainers or settling tanks in the path of flow from the oil pump to the chassis lines, and therefore dispense with the need for occasional service and additional expenditure which such cleansing elements might require.

Another object is to provide a system of the above type, the elements of which may be preferably installed without substantially perforating, boring or modifying any part of the engine structure, and in which the feed of lubricant to the chassis bearings is sufficient for the needs of the bearings in winter when the oil in the chassis lines becomes highly viscous and yet not overabundant in summer when the oil is quite limpid.

A feature of the invention is to utilize a distributing conduit system for the chassis, supplied from the engine oil pump, the entire length from the pump to the various drip plugs being desirably of effective cross section or bore sufficiently coarse to pass oil of the moderate degree of cleanness found in the ordinary engine oil pan, yet without clogging, though dispensing with the special cleansing instrumentalities such as filters, strainers or settling tanks used to attain the degree of cleanness required where highly restricted master resistances are employed.

In the present case, generically as in that of the prior application of Bijur, resort is had to a ballast flow resistance, preferably applied at a hot part of the engine, the temperature of which remains more nearly uniform summer and winter than does that of the chassis, and which serves to step down effective pump pressure applied to the distributing system leading to the chassis bearings. A particular feature is the installation of the ballast resistance at the exhaust pipe to which it is clamped without mutilation of the exhaust pipe and in heat interchange relation therewith.

In view of the relatively large bore of the ballast resistance used and its correspondingly lower obstructing or throttling effect, as compared with that of the master resistance of the Bijur application, feeding possibly 100 times more oil than the chassis bearings require, said element is arranged for divided output in such manner that substantially all of the outflow therefrom, say 99% thereof, is returned to the engine oil pan and only a small proportion thereof, say 1%, is admitted to the chassis system. While the ballast resistance thus passes lubricant at relatively high rate compared to the chassis requirements and affords a correspondingly low resistance to flow, yet said obstructing effect is sufficiently great relatively to the line resistance and sufficiently constant during widely varying atmospheric conditions to reduce materially the great falling off in feed to the chassis bearings, otherwise occurring in winter as compared to summer operation, due to the tremendous rise in viscosity as the oil in the chassis lines becomes chilled.

The output through the ballast resistance, which is returned to the engine oil pan, is preferably conveyed through a conduit arranged to duplicate more or less the temperature conditions prevailing in the chassis so that the proportional division as between the oil return and the oil fed to the chassis will not be materially disturbed due to the otherwise disproportional rise of resistance in the chassis lines in winter.

In the accompanying drawings in which are shown one of the various possible embodiments of the several features of the invention:

Fig. 1 is a diagrammatic side view of the front portion of an automobile chassis and engine with a portion of the chassis frame removed showing a desirable installation and Fig. 2 is a front view thereof on a larger scale, part thereof shown in section upon the line 2—2 of Fig. 1;

Figs. 3 and 4 are top and side views, respectively, of one form of ballast resistance, Fig. 3 being a longitudinal section upon the line 3—3 of Fig. 4;

Figure 5:
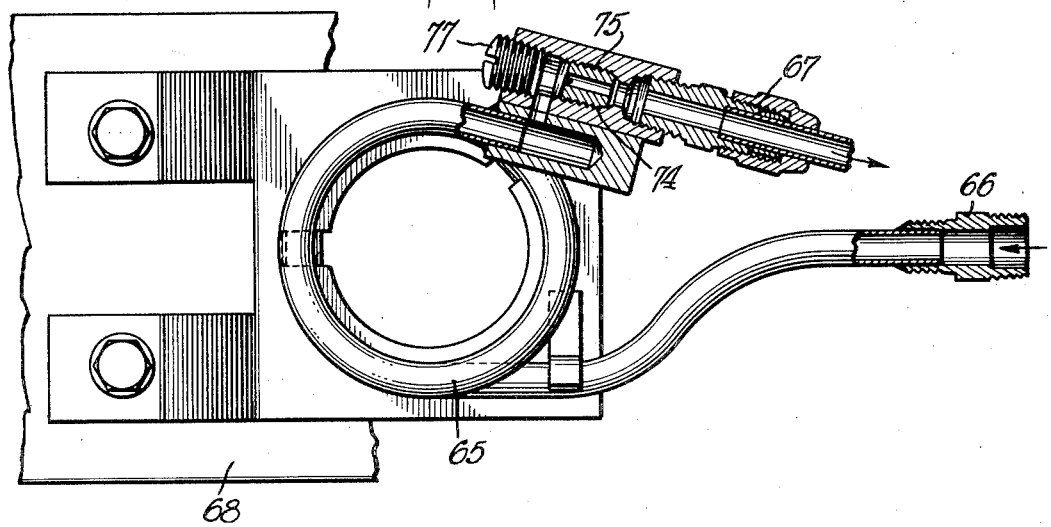
Figs. 5 and 6 are top and side views, respectively, showing a portion of the return, and Fig. 5 being partly in section upon lines 5—5 of Fig. 6.

Referring to Figs. 1 and 2, the engine E is supported upon the chassis frame C and the lower portion of the engine structure forms a reservoir R supplying a gear pump P (see particularly Fig. 2), which forces lubricant through the resistance T (see particularly Fig. 1), and thence in parallel to a return and a chassis distributing system, both of which are attached to the chassis frame. The gears 11 of the pump P are turned by actuating connections from some part of the engine. Adjacent the bottom of the reservoir R is the screen intake 10 for the gear pump P and the main outlet of the pump by the conduits 12 and 13 supplies the crank shaft and other engine bearings, one crank shaft bearing 14 being illustratively shown. A by-pass line 15 leads to a relief valve 16, which permits excess lubricant to flow back to the reservoir R when the pump pressure exceeds the seating pressure of the relief valve.

The inlet side of the relief valve structure 16 is provided with an outlet conduit 19 (see Fig. 1) to an oil pressure gauge 20 upon the instrument board and another outlet conduit line 21 to a coupling 25 connected to the ballast resistance (see Figs. 3 and 4). The latter comprises a coil of small bore tubing 26 enclosed within a metal cylinder 27. One end of the open metal cylinder 27 is provided with a transverse pin 28 riveted to the sides thereof to hold the coil in place and the other end has a telescoping fit with a shank 29 having a flared-shaped adapter 24 with a rim 18 of materially larger diameter than the exhaust pipe 22 and with opposite notches to straddle snugly the exhaust pipe. The adapter is rigidly affixed to the pipe by the mounting straps 23 with ears 31 secured by the screws 35 to lugs 35' on the adapter to hold the ballast resistance in place thereon. The initial portion 33 to the resistance coil 26 enters through the open end of the cylinder 27 and the outlet portion 34 thereof extends through an aperture 57 in the side of the cap 29. The outlet portion 34 connects with a junction fitting 36 screwed to the side of the flared portion 24 of the adapter 29. This fitting 36 connects with an outlet line 50 (see Fig. 1) to a junction 51 supplying the chassis lubricating system 52—53—54 and also with a return line 55.

Figure 6:
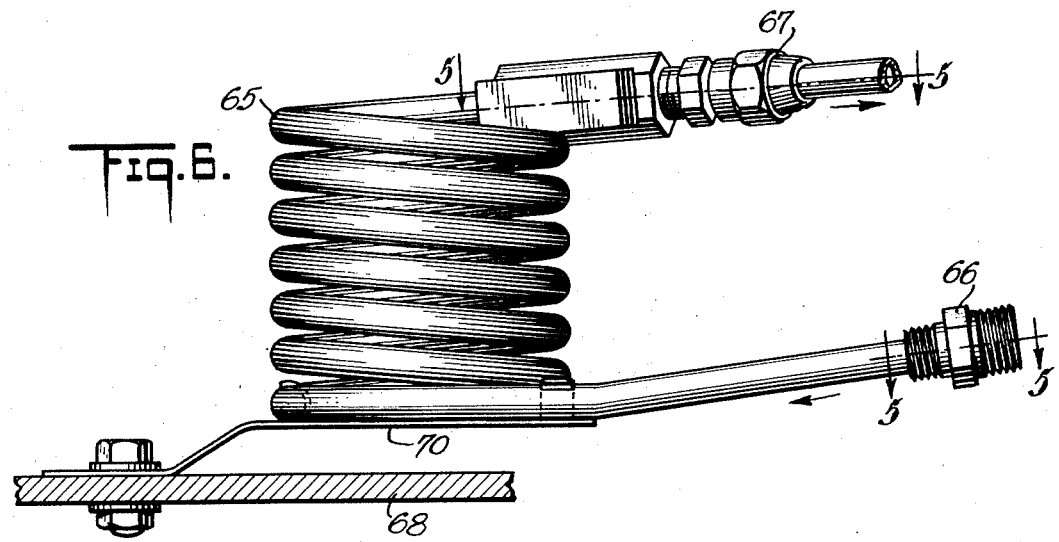

To prevent any great variation in the proportioning of the flow between the chassis system 52—53—54 and the engine oil return 55, as the oil in the chassis lines becomes more viscous in cold weather, means is provided substantially to duplicate in the engine oil return, the conditions inherently existing in the chassis lines. For this purpose a flow resistance is provided on the return 55 and a cooling coil is placed in advance thereof to assure that the hot oil will have been cooled sufficiently by the time it reaches the resistance. The cooling coil (see particularly Figs. 5 and 6) consisting of a coil of large bore tubing 65 with spaced convolutions, to permit passage of cooling air currents therethrough with facility, is clipped to a plate 70 and this plate is bolted to the inside of the horn 68 of the chassis frame in front of the radiator 72 (see also Fig. 1). The outlet connection 67 is provided with a tapped socket 74 sealed by a plug 77 and enclosing a restriction plug 75, the resistance of which is proportioned to the total resistance of the chassis distributing lines, to return the proper proportion of lubricant to the crank case.

Figure 7:
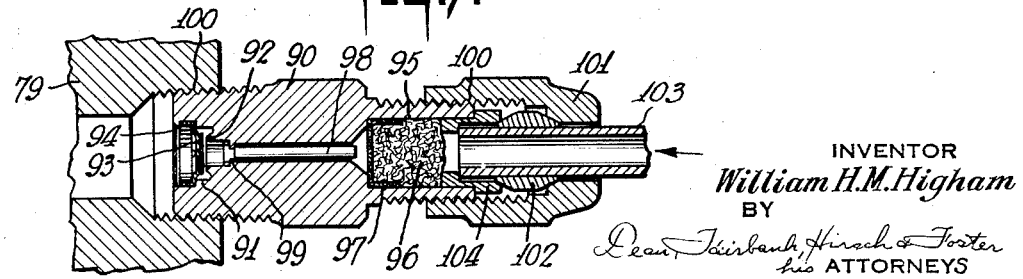
Fig. 7 shows a typical flow metering device or drip plug in longitudinal section.

At the bearing terminals or ends of the conduit system 52—53—54 are positioned metering or restriction devices which may be desirably approximately of the form shown in Fig. 7 in which a fitting 90 has a socket 91 at its outlet end formed as a valve seat 92 with a coacting flap valve 93 retained in place by a perforated and embossed retainer 94. Into the inlet socket 95 is plugged a filter or strainer 96 having a metalic mesh backing 97. In a longitudinal bore between the valve and the strainer is disposed a restriction pin 98 maintained by staking at 99 from engagement with the flap valve 93. Pins of different diameter are used in accordance with the desired ratings of the fitting, the longitudinal bores of the fittings being preferably identical.

The drip plug, as shown, is preferably threaded at 100 for application in a tapped socket in a bearing element 79 and it has a threaded inlet end 100 for application thereto of a coupling for effecting a pipe connection. The pipe coupling may comprise a thimble 101 screwed upon the outside of the threaded portion 100, a compression coupling sleeve 102 enclosed therein and encircling the pipe end 103 and the steel bushing 104, which serves to hold the felt 96 in position and provides a shoulder stopping the pipe end 103. The coupling sleeve 102 clamps the pipe in position and is in turn clamped between the inner bevels of the thimble 101 and the steel bushing 104.

While the various elements of the supply installation may be made in dimensions or of resistances suited to the particular use to which the system is put, the application of the device for automobile chassis lubrication renders certain dimensions and proportions particularly suitable for universal application to various widely differing makes of automobiles. By way of example, resistance T may consist of about 10 feet of $\frac{1}{16}$ inch bore tubing while the cooling coil may consist of 4 feet of $\frac{1}{16}$ inch bore tubing with a restriction orifice at the termination thereof of $\frac{5}{8}$ inch in length and $\frac{1}{16}$ inch in diameter. Using resistances of this character and an engine oil pump adapted to maintain a range of pressure of about 25 to 35 pounds, the ballast resistance will pass a very small proportion of the total engine oil output, the return 55 receiving about 99% of the amount passing through said ballast resistance while the chassis distributing system will receive about 1% or about $\frac{1}{16}$ of a cubic centimeter per minute throughout the operation of the system.

In operation, briefly stated, the engine oil pump while lubricating the engine in the usual manner feeds lubricant through the ballast resistance coil 26, the output of which divides, the bulk thereof passing through the return conduit 55 back to the engine oil pan R, and a very small proportion thereof passing through the conduit 50 to the distributing system of the chassis 52—53—54. The ballast resistance T is maintained at an elevated temperature, at which viscosity of lubricant changes least with variation in temperature, by a blast of air which is heated by passing around the hot exhaust pipe 22 and enters the rearwardly projecting cylinder 27 through the space between the rim 18 of the adapter and the exhaust pipe 22. If more air tends to enter the cylinder 27 than is highly heated in passage by the exhaust connection 22, suitable blocking means (not shown) might be provided such as a butterfly valve at the rearward end of the cylinder 27 or metallic wool might be loosely stuffed into the space within the coil 26. The resistance or obstructing effect of the chassis lubricating system 52—53—54 and of the engine oil return conduit 55 are such that a substantial proportion of the effective pressure generated by the engine oil pump P will have been consumed in forcing the oil through the ballast resistance T. The residual pressure on the chassis distributing system 52—53—54 will bring about sustained flow through the drip plug outlets 90, shown in Fig. 7, in accordance with bearing requirements. Since the engine return conduit, in effect, duplicates the temperature conditions existing in the chassis system, the proportional distribution as between the oil fed to the chassis and that returned to the engine oil pan remains roughly constant throughout operation at all temperatures.

Thus it will be seen that the present invention permits lubricant taken from the crank case of an automobile engine and of the degree of cleanness commonly used for the purpose to be utilized directly without other cleansing operation for lubricating the various chassis bearings and ensures that desirable amounts thereof will be continuously supplied to the chassis lubricating system substantially regardless of weather conditions throughout the running of the vehicle. In employing existing instrumentalities, such as the engine oil pump, and in drawing upon a lubricant supply already present without at the same time adding cleansing apparatus or complicated flow controlling mechanisms and valves the installation of a chassis lubricating system is greatly simplified and the cost thereof materially decreased.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

1. A liquid distributing installation having flow proportioning outlets of the character requiring increased pressure with drop of temperature in order to prevent excessive reduction in the rate of feed, comprising a source of nearly constant pressure, a conduit system, a ballast flow resistance interposed between said source of pressure and said system, said ballast resistance having a substantial length of conduit of bore sufficiently large to pass solid particles contaminating the liquid and of obstructing effect so small as to pass liquid at rate greater than desired through said outlets and means associated with said resistance for effecting reduction in the feed to said system substantially to the requirements of said outlets.

2. A liquid distributing installation having flow proportioning outlets of the character requiring increased pressure with drop of temperature in order to prevent excessive reduction in the rate of feed, comprising a source of nearly constant pressure, a conduit system, a ballast flow resistance interposed between said source of pressure and said system, said ballast resistance presenting a substantial length of conduit of bore sufficiently large to pass solid particles contaminating the liquid and of obstructing effect so small as to pass liquid at rate greater than desired through said outlets and means associated with the outlet of the ballast resistance for cutting down the feed to said system.

3. A liquid distributing installation having flow proportioning outlets of the character requiring increased pressure with drop of temperature in order to prevent excessive reduction in the rate of feed, comprising a source of nearly constant pressure, a conduit system, a ballast flow resistance interposed between said source of pressure and said system, said ballast resistance having a substantial length of conduit of bore sufficiently large to pass solid particles contaminating the liquid and of obstructing effect so small as to pass liquid at a rate greater than desired through said outlets, an auxiliary outlet conduit associated with said resistance for effecting reduction in the feed to said system substantially to the requirements of said outlets and means for maintaining a substantially constant relationship between the temperature of the conduit system and the auxiliary outlet conduit.

4. A lubricant distributing installation having flow proportioning outlets of the character requiring increased pressure with drop of temperature in order to prevent excessive reduction in the rate of feed, comprising a source of nearly constant pressure, a conduit system, a ballast flow resistance interposed between said source of pressure and said system, said ballast resistance having a substantial length of conduit of bore sufficiently large to pass solid particles contaminating the lubricant and of obstructing effect so small as to pass lubricant at rate greater than desired through said outlets, and means associated with said resistance for effecting reduction in the feed to said system substantially to the requirements of said outlets, of such character that only in the order of 1% of the lubricant passing through the ballast resistance passes into the conduit system.

5. In association with an automotive engine lubricating system, a chassis lubricant distributing installation having flow proportioning drip plug outlets and utilizing engine lubricant and the engine oil pump, comprising a ballast flow resistance interposed between said pump and said system, said ballast resistance having a substantial length of conduit of bore sufficiently large to pass solid particles contaminating the engine lubricant and of obstructing effect so small as to pass lubricant at rate greater than desired through said outlets and means associated with said resistance for effecting reduction in the feed to said system substantially to the requirements of said outlets.

6. A chassis lubricant distributing installation having flow proportioning drip plug outlets, comprising a source of nearly constant pressure, a conduit system, a ballast flow resistance interposed between said source of pressure and said system, said ballast resistance having a substantial length of conduit of bore sufficiently large to pass solid particles contaminating the lubricant and of obstructing effect so small as to pass lubricant at rate greater than desired through said outlets, means associated with said resistance for effecting reduction in the feed to said system substantially to the requirements of said outlets and means for maintaining said ballast resistance at a more uniform temperature than that of the conduit system.

7. In combination with an engine lubricating system for an automotive engine including a circulating pump, a central chassis lubricating installation comprising a distributing conduit system and a resistance constituting a connection between said pump and said conduit system, said resistance consisting of a long coil of tubing enclosed in a cylindrical sleeve, one end of which is provided with means enabling it to be clamped to an engine part without mutilation of the same.

8. In combination with a circulatory lubricating system for an internal combustion engine, a central chassis lubricating installation utilizing the engine circulating lubricant pump as a pressure source and the engine lubricant and comprising a conduit system, a resistance passage between said conduit system and said pump, a return resistance passage, means for heating the first mentioned resistance passage by means of the exhaust gases from said engine and means for cooling the second mentioned resistance passage to atmospheric temperature, said passage receiving engine lubricant in its ordinary state of purity without clogging and said combination being devoid of cleansing instrumentalities for the engine lubricant before passing through said resistance passages.

9. In association with an automotive engine embodying hot exhaust connections, a central chassis lubricating installation comprising a reservoir, a distributing conduit system, a resistance at the inlet to said distributing conduit system, a source of pressure adapted to force lubricant from said reservoir into the distributing conduit system, a flow line to return a portion of lubricant from the first mentioned resistance to the reservoir and means for heating said first mentioned resistance from said exhaust connections, said resistance and said return line consisting in part of coils of tubing the former coil being protected from cooling by air currents and the latter coil being positioned so that it will be cooled by air currents.

10. In association with an automotive engine including hot exhaust connections, a central chassis lubricating installation comprising a reservoir, a distributing conduit system with flow controlling outlets and with a substantial resistance at the inlet thereof, a source of pressure serving to force lubricant through said resistance into said conduit system and an additional resistance serving to conduct lubricant which has passed the first mentioned resistance back to said reservoir, said second resistance consisting in part of a coil of tubing with spaced convolutions and in part of a restriction plug at the end of said coil.

11. In association with an automotive engine having exhaust connections, a central chassis lubricating installation comprising a reservoir, a conduit system having a resistance at the inlet thereof substantially greater than the resistance of the remaining portion of the conduit system, a source of pressure for forcing lubricant from said reservoir through said resistance into said conduit system and means for clamping said resistance upon an exhaust connection.

12. In combination with an engine lubricating system for an automotive engine including a circulating pump and exhaust connections, a central chassis lubricating installation comprising a distributing conduit system, a return and a resistance constituting a connection between said pump and said conduit system, said resistance consisting of a coil of tubing, a cylindrical sleeve enclosing said coil of tubing, an adapter attached to one end of said cylindrical sleeve serving to attach said cylindrical sleeve and enclosed tubing to an exhaust connection and a dividing fitting on the outside of the adapter serving to divide the effluent from said resistance between the distributing conduit system and the return.

13. In combination with an engine lubricating system for an automotive engine including a circulating pump and exhaust connections, a central chassis lubricating installation comprising a distributing conduit system, a return and a resistance constituting a connection between said pump and said conduit system, said resistance consisting of a coil of tubing, a cylindrical sleeve enclosing said coil of tubing and an adapter attached to one end of said cylindrical sleeve serving to attach said cylindrical sleeve to an exhaust connection, said sleeve extending rearwardly from said connection and the edges of the adapter adjacent the connection being sufficiently spaced therefrom so as to permit the entry of a sufficient blast of air as will be highly heated by the exhaust connection.

14. In association with an automotive engine having exhaust connections, a central chassis lubricating installation comprising a reservoir, a conduit system having a resistance at the inlet thereof substantially greater than the resistance of the remaining portion of the conduit system, a source of pressure for forcing lubricant from said reservoir through said resistance into said conduit system and means for clamping said resistance upon an exhaust connection, said conduit system being provided with highly restricted flow controlling elements ahead of the bearings of the chassis and said inlet resistance being substantially greater than the total resistance of said flow controlling elements.

WILLIAM H. M. HIGHAM.